United States Patent [19]
Morrone

[11] Patent Number: 4,750,611
[45] Date of Patent: Jun. 14, 1988

[54] MEDIA STORAGE APPARATUS

[76] Inventor: James V. Morrone, 25 Sea Foam Ave., Winthrop, Mass.

[21] Appl. No.: 785,154

[22] Filed: Oct. 7, 1985

Related U.S. Application Data

[63] Continuation-in-part of Ser. No. 756,716, Jul. 19, 1985, Pat. No. 4,514,157.

[51] Int. Cl.⁴ .............................................. B65D 85/57
[52] U.S. Cl. .................................. 206/45.13; 206/309; 206/444; 220/85 R; 220/335
[58] Field of Search ................ 206/303, 309, 310–313, 206/387, 444, 45.13; 220/85 CH, 85 R, 335; 369/291; 360/133

[56] References Cited

U.S. PATENT DOCUMENTS

| 3,749,872 | 4/1976 | Paudras | 206/310 |
| 4,005,798 | 2/1977 | Minsky | 220/85 CH |
| 4,208,117 | 6/1980 | Harvey et al. | 206/620 |
| 4,345,697 | 8/1982 | Wilson et al. | 220/335 |

FOREIGN PATENT DOCUMENTS

| 0008855 | 4/1895 | United Kingdom | 220/85 R |
| 2112751 | 7/1983 | United Kingdom | 206/387 |

Primary Examiner—Jimmy G. Foster
Attorney, Agent, or Firm—Wolf, Greenfield & Sacks

[57] ABSTRACT

A storage case for disc-type media including a clip for retaining the case in a partially open position. Support means for the disc in the case is in the form of integral support members integrally disposed from the base of the case. Also shown is a holder for a pick-up device for the disc.

11 Claims, 4 Drawing Sheets

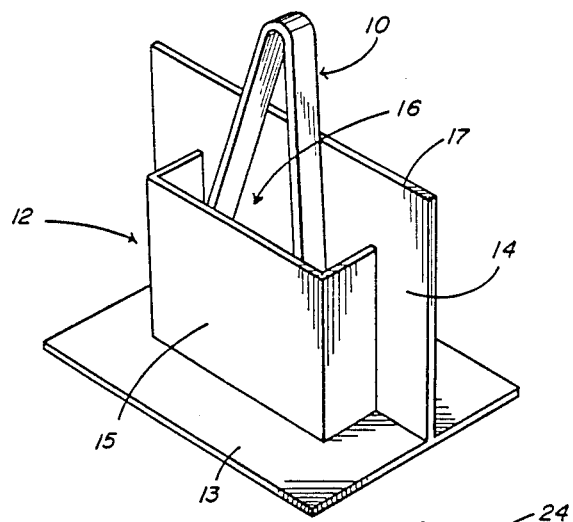
Fig.1
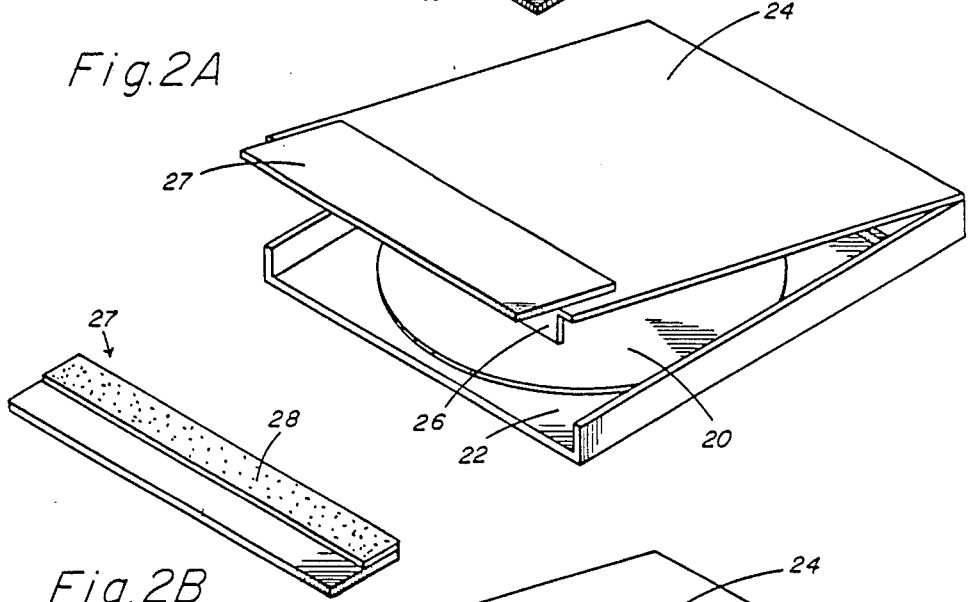
Fig.2A
Fig.2B
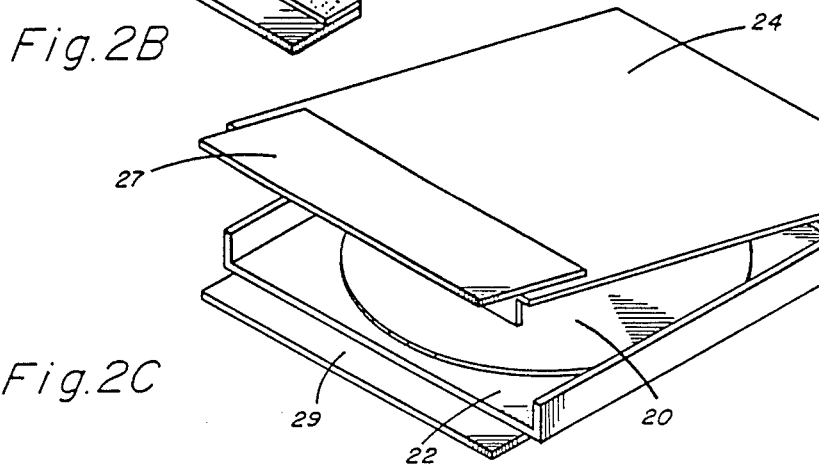
Fig.2C

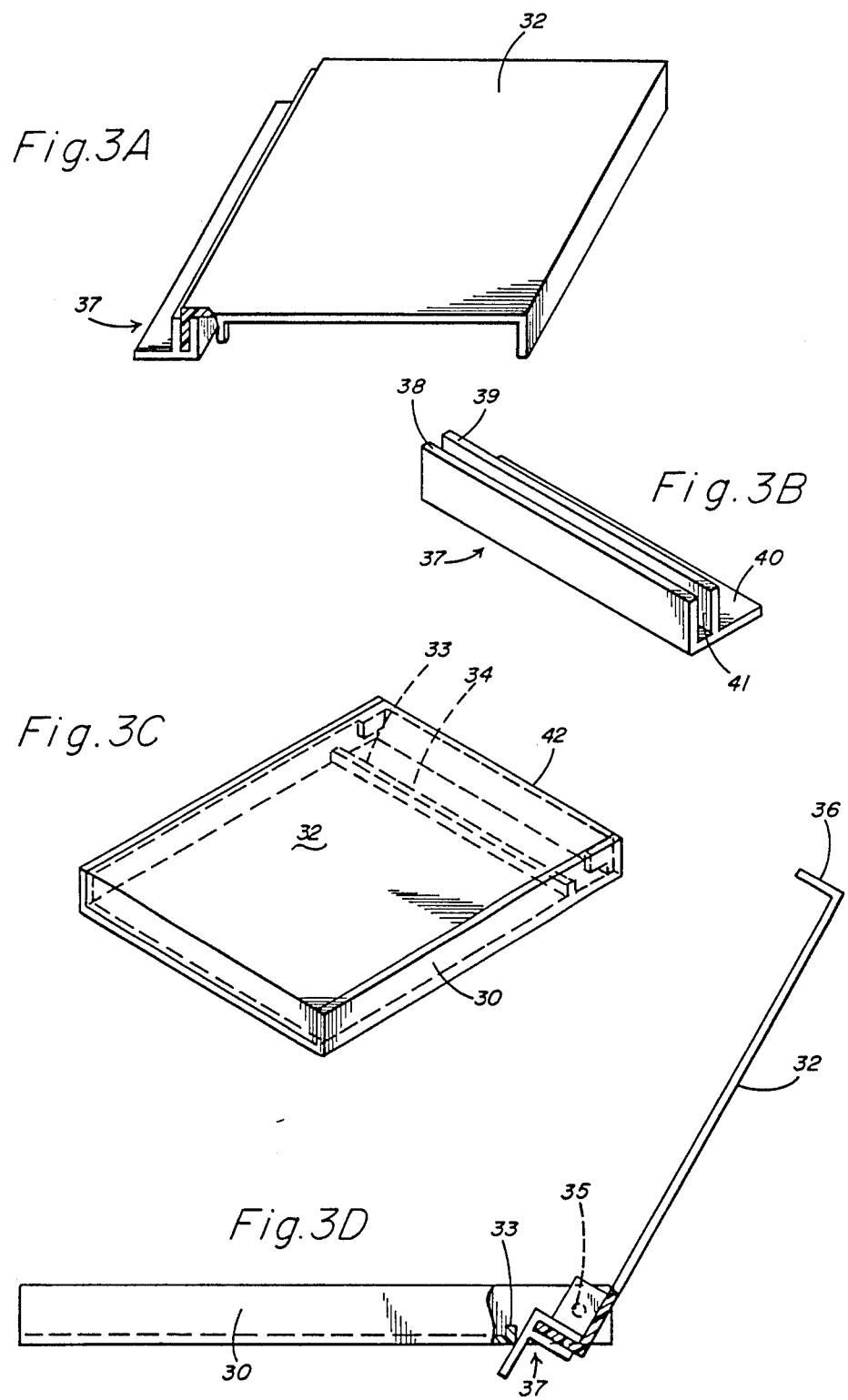

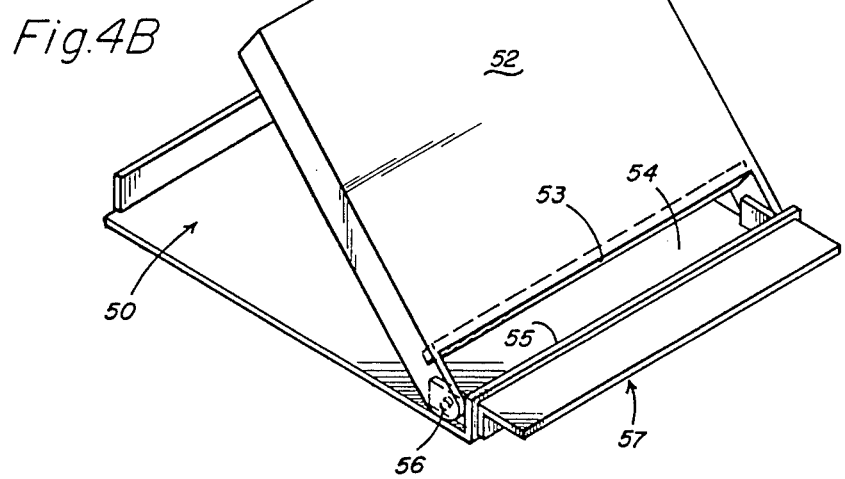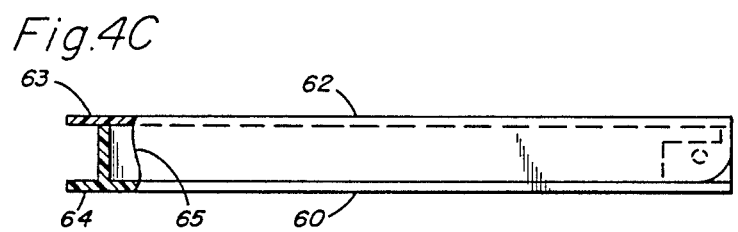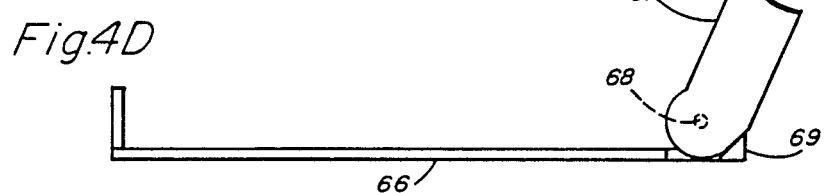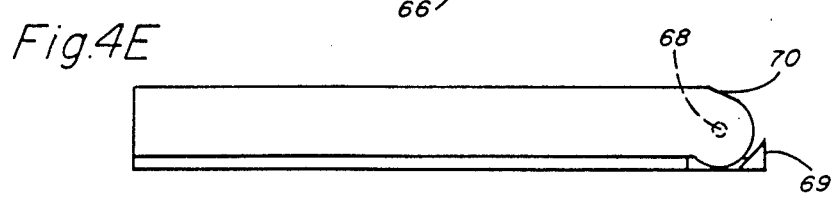

MEDIA STORAGE APPARATUS

RELATED APPLICATION

This is a continuation in part of application Ser. No. 756,716 filed July 19, 1985, U.S. Pat. No. 4,514,157.

BACKGROUND OF THE INVENTION

The present invention relates in general to a storage apparatus for media. More particularly, the invention relates to improvements in storage cases or the like for the storage of discs including, but not limited to compact audio discs that are now coming into extensive use.

In my prior application Ser. No. 756,716 there is described a number of different embodiments of storage cases or containers for these discs. It is the purpose of the present invention to now set forth additional embodiments that present further improvements in the state of the art.

Accordingly, it is an object of the present invention to provide an improved storage case or a container for media and in particular for compact discs.

Another object of the present invention is to provide an improved means associated with storage cases for facilitating opening thereof.

A further object of the present invention is to provide means for retaining a disc pick-up device so that it is in readiness for use.

SUMMARY OF THE INVENTION

To accomplish the foregoing and other objects, features and advantages of the invention, there is provided an improved form of storage case having disposed therein, in one embodiment an integral support member for the disc. In accordance with another feature of the present invention there is provided an improved clip for use with the storage case and which enables the storage case to be lifted to a partially opened position. In accordance with another feature of the present invention there is provided a stick-on thumb lift that is readily attached to the cover of the storage case and which enables one to easily lift the cover. In a related embodiment there is preferably a stick-on lift on both the cover and base to further facilitate opening. In accordance with still a further feature of the present invention there is provided a storage device for a disc pick-up device. This storage device is in the form of a storage compartment having a back wall that permits ready access to the pick-up device.

BRIEF DESCRIPTION OF THE DRAWINGS

Numerous other objects, features and advantages of the invention should now become apparent upon a reading of the following detailed description taken in conjunction with the accompanying drawings, in which:

FIG. 1 is a perspective view of the storage device for the disc pick-up device;

FIGS. 2A–2C illustrate stick-on thumb lift means associated with the disc storage case. Illustrating in one embodiment the lift device associated with the cover and in another embodiment associated with both the cover and base;

FIGS. 3A–3D illustrate another embodiment of the storage case employing a plastic clip that enables the storage case to be open to a partially open tilted back position;

FIGS. 4A–4E illustrate a further embodiment of the present invention in the form of an angle member at the rear of the case which also permits the case to be maintained in a partially opened position.

DETAILED DESCRIPTION

Figure 5A:
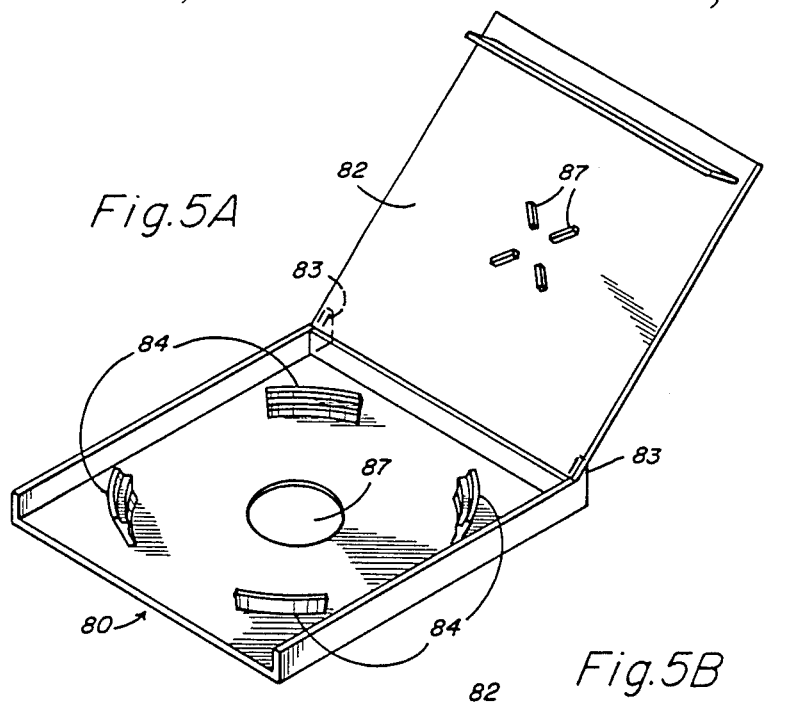
FIGS. 5A–5E illustrate a further embodiment of the invention in the form of an integral support member for the disc within the storage case along with associated retaining means preferably integral with the case cover or width.

Reference is now made to the perspective view of FIG. 1 which illustrates a pick-up device. This pick-up device may be of the type illustrated in my earlier copending application such as illustrated in FIGS. 15-21 of that application. The pick-up device 10 is contained within a storage member 12 which comprises a flat base 13, a rear wall 14, and a three-sided wall 15 which with the wall 14 provides a storage compartment 16. The rear wall 14 forms a back stop and guide so that the pick-up device 10 may be easily inserted into the holder. It is noted that the top edge 17 of the wall 14 has a height so as to permit the device 10 to extend there above. This lowered wall 14 enables the pick-up device 10 to be free from obstruction to enable the user to lift the pick-up device out without any problem. The base wall 13 holds the holder in an upright position as illustrated.

The pick-up device 10, because it extends above the top edge 17 of wall 14 is readily available to be selected when desired. When the pick-up device is to be inserted back into the holder it may simply be inserted into the compartment 16 against the rear wall 14 and held in the general position illustrated in FIG. 1.

FIG. 2A illustrates a disc storage compartment for the disc 20. In FIG. 2A this is shown as comprising a base 22 and a cover or lid 24. The lid 24 has a downwardly depending front wall 26 that normally closes with the base. FIG. 2B illustrates the thumb lift 27 with the double sticky piece 28. From the position illustrated in FIG. 2B the thumb lift 27 is inverted and placed on the top front edge of the lid 24 extending frontwardly therefrom as illustrated in FIG. 2A. This enables 1, once the thumb lift 27 is inserted in place as in FIG. 2A, to easily lift the lid 24.

FIG. 2C illustrates an alternate embodiment in which there is also shown the thumb lift 27 secured to the lid 24. However, there is also shown a substantially identical thumb lift 29 secured to the underside of the base 22 of the disc case. The thumb lift 29 also of course has a sticky back and thus is substantially identical to the member illustrated in FIG. 2B. In the embodiment of FIG. 2C there are thus two pairs of thumb lifts one on the lid and one on the base. This is desirable in instances where additional assistance may be needed to open the storage case.

Reference is now made to FIGS. 3A–3D. This embodiment of the invention illustrates a storage case which is comprised of a base 30 and cover or lid 32. It is noted that the base 30 has extending from the bottom thereof a small upright wall 33. In front of the wall 33 the base 30 of course has a bottom flat surface upon which the disc or insert may rest. Behind the wall 33 at the bottom of the case there is an open space at 34.

It is also understood in the embodiment of FIGS. 3A–3D there is some type of a hinging means not specifically illustrated but identified schematically by the hinge point 35 in FIG. 3D. It is also noted from FIG. 3D that the cover 32 has a front covering member 36.

Now, with regard to the embodiment of FIGS. 3A-3D, there is provided a plastic clip 37 that is comprised of upright walls 38 and 39 and a rearwardly directed wall 40. The wall 40 is rearwardly directed such as in the position of FIG. 3A. The walls 38 and 39 form a channel 41 and as illustrated in FIG. 3A this channel is adapted to receive the rear wall 42 of the lid 32.

In the normal closed position of the storage case, the wall 40 is directed rearwardly. However, when the case is opened, the clip 37 permits the lid 32 to move to a partially opened position as clearly illustrated in FIG. 3D. The wall 40 contacts the upright wall 33 and limits the open position of the lid to that illustrated in FIG. 3D. As indicated previously, the rear of the base of the case is open at 34 and this permits the clip 37 to clear the sides of the base and only contact something when it comes into contact with the upright wall 33.

FIGS. 4A-4E illustrate further features of the present invention. In particular, FIG. 4B illustrates a storage compartment in which the cover and base have essentially been reversed in comparison to the case illustrated in FIG. 3C. As far as the orientation is concerned in FIG. 4B, the case comprises a base 50 and a cover 52. The cover 52 has an inwardly directed wall 53 and is open at 54. The rear wall 55 of the base supports hinging means to enable the cover to be pivotally connected to the base. This hinging means is illustrated at 56.

In accordance with the invention as illustrated in FIG. 4A there is provided a plastic angle member 57 that has secured to one leg thereof a sticky back material 58 which may be a sticky back tape having adhesive on both sides. FIG. 4A illustrates the plastic angle with the sticky back applied. FIG. 4B illustrates the plastic angle member 57 secured to the rear wall 55 of the base.

Now, in the closed position of the case, the plastic angle member 57 does not interfere at all with the operation of the case. The case may be opened to a rearwardly tilted position in which case the wall 53 contacts the top surface 58 of the angle member 57. In FIG. 4B the lid is shown in a partially opened position. However, if the lid is moved rearwardly then the lid is permitted to rotate past a 90° opened position to a position in which the wall 53 finally contacts the surface 58 of the angle member 57.

FIG. 4C shows another feature of the present invention in which there is provided a base 60 and a cover or lid 62. It is noted that the base 60 has a front wall 65 and there is a thumb lift associated with both the cover and base. As illustrated in FIG. 4C there is an integral extension 63 of the cover that forms a thumb lift. Similarly, there is an extension 64 of the base 60 that also forms a thumb lift. Both of these are integrally molded into the disc case.

FIGS. 4D and 4E illustrate a further embodiment of the present invention. In FIGS. 4E and 4D there is shown a fragment of the base 66 and cover 67. There is a pivot hinge at 68 between the cover and base. The base is provided with an integral lid stop 69. This is molded directly into the base of the case. This keeps the cover from falling all the way back. FIG. 4D illustrates the cover 67 and its rearward tilted position with the cover preferably being provided with a flat 70 that is adapted to engage the stop 69 as illustrated in FIG. 4D. FIG. 4E illustrates the case in its closed position in which the flat 70 is out of engagement of course with the stop 69.

Reference is now made to FIGS. 5A-5E which illustrate further features of the present invention. FIG. 5A illustrates a storage case with integral disc support. In my prior application there is provided a separate insert. However, in accordance with the features described herein, the support for the disc is now integral with the storage case base.

Thus, there is illustrated a storage case base 80 and associated lid 82. In the embodiment of FIG. 5A there is also provided a back stop 83 so that the lid remains in a backward angular position. Extending upwardly from the floor of the base 80 are four upright support member 84. Each of these support members are tilted as illustrated in FIGS. 5C and 5D. FIGS. 5C and 5D are substantially identical with the exception that the embodiment of FIG. 5C also includes the ledge 85 for supporting the disc 86. As indicated these uprights or support member 84 are disposed at an angle and are molded directly into the base of the plastic disc case. There is also, as illustrated the preferred hole 87 in the base. These support members hold the disc in an elevated position such as illustrated in either FIG. 5C or FIG. 5D.

Figure 5B:
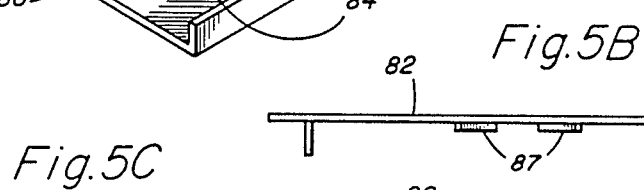
Figure 5C:
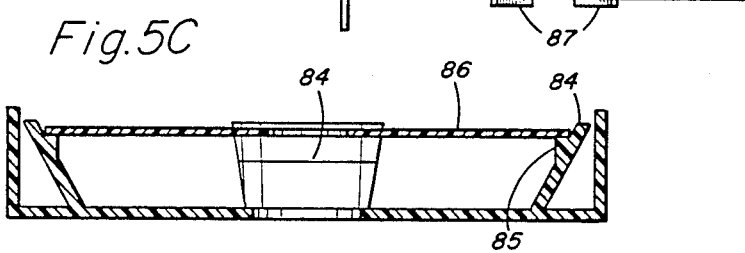
Figure 5D:
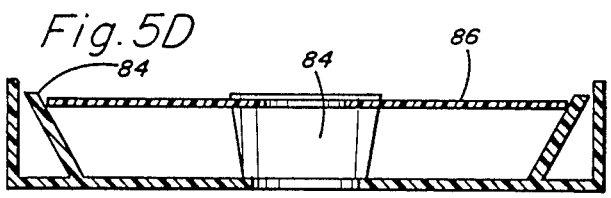

Now, with regard to FIG. 5B it is noted that the lid 82 has a plastic ridges 87 as also illustrated in FIG. 5A. These extend downwardly and contact the center of the disc to hold the disc in place when the cover is closed. This prevents the disc from moving when the container is in its closed position. The ridges 87 contact only the center of the disc and thus do not do any damage to the media part of the disc.

Figure 5E:
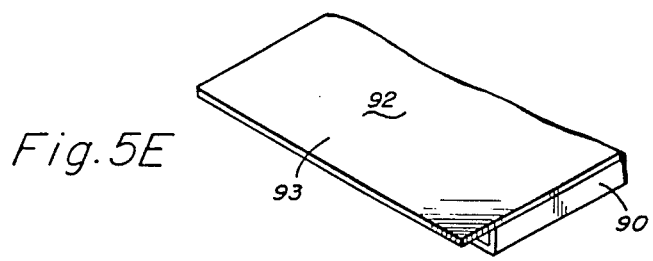

Finally, in FIG. 5E shows a case base 90 and a lid 92 with the lid 92 having an extension 93 that forms a thumb lift that is directly molded into the lid of the case. This permits the lid to be lifted with ease.

Having now described a limited number of embodiments of the present invention it should now be apparent to those skilled in the art that numerous other embodiments and modifications thereof are contemplated as falling within the scope of the present invention as defined by the appended claims.

What is claimed is:

1. A storage case for a disc-type media comprising a base and cover and hinge means intercoupling the base and cover to permit the storage case to fold between closed and open positions, said cover having a rear wall, said base having a bottom wall terminating short of the rear of the base to provide a rear base opening defined in part by the base bottom wall rear edge, in combination with a thumb lift means disposed at a front of said cover and extending beyond said cover and base, said cover having a substantially flat planar surface for receiving said thumb lift means, said thumb lift means comprising, a planar thumb lift of elongated construction extending in a direction from side-to-side of the cover at the front edge thereof, and a planar adhesive piece for removably attaching the thumb lift to the substantially flat planar surface of the cover, said planar adhesive piece having a width contacting the thumb lift that is less than the width of the planar thumb lift so as to leave an elongated marginal edge of the thumb lift freely exposed and extending from the front edge of the cover.

2. A storage case for a disc-type media as set forth in claim 1 wherein said planar adhesive piece comprises a sticky back foam material for securing to the cover.

3. A storage case for a disc-type media as set forth in claim 1 comprising a thumb lift means on both said base and cover extending outwardly therefrom so as to assist in opening between the cover and base.

4. A storage case for a disc-type media as set forth in claim 1 and further in combination with a clip on the rear wall of the storage case, said clip maintaining said cover in a substantially vertical upright position in the open position of the case.

5. A storage case for a disc-type media as set forth in claim 4 wherein said base has an upright wall forming a stop means whereby the plastic clip holds the disc case in a rear angle upright position when open, said clip having an outwardly extending wall that engages with said stop means.

6. A storage case for a disc-type media as set forth in claim 1 wherein the base has side walls that extend beyond the base bottom wall to in part define said opening.

7. A storage case for a disc-type media as set forth in claim 1 including, in combination, a stop means, said rear wall having means for receiving the stop means to limit the open position of the cover.

8. A storage case for a disc-type media as set forth in claim 7 wherein said stop means comprises a clip including a pair of side walls defining a recess into which the cover rear wall engages to hold the clip on the base, and means for engaging the base bottom wall rear edge only in the open position of the case and to so limit the open position to a substantially upright one.

9. A storage case for a disc-type media as set forth in claim 1 including a planar thumb lift and a planar adhesive piece disposed on both the base and cover wherein only one hand is required to provide opening between the base and cover.

10. A storage case for a disc-type media as set forth in claim 1 wherein the thumb lift means is separable from the cover after being attached thereto.

11. A storage case for a disc-type media as set forth in claim 1 wherein said thumb lift means extends across substantially the full front width of the cover.

* * * * *